US012207594B2

(12) United States Patent
Walter et al.

(10) Patent No.: US 12,207,594 B2
(45) Date of Patent: Jan. 28, 2025

(54) PARTIALLY-UNLOUVERED SIEVE MECHANISM

(71) Applicant: DEERE & COMPANY, Moline, IL (US)

(72) Inventors: Jeffrey R. Walter, East Moline, IL (US); Kevin P. Hurley, East Moline, IL (US); Michael T. Meschke, East Moline, IL (US); Yogesh Chande, East Moline, IL (US); Kelli Martin, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 1066 days.

(21) Appl. No.: 16/997,458

(22) Filed: Aug. 19, 2020

(65) Prior Publication Data

US 2022/0030771 A1    Feb. 3, 2022

Related U.S. Application Data

(60) Provisional application No. 63/059,429, filed on Jul. 31, 2020.

(51) Int. Cl.
*A01F 12/44* (2006.01)
*A01F 12/46* (2006.01)
*B07B 1/46* (2006.01)

(52) U.S. Cl.
CPC ............ *A01F 12/448* (2013.01); *A01F 12/46* (2013.01); *B07B 1/4645* (2013.01)

(58) Field of Classification Search
CPC ............................... B07B 1/46; B07B 1/4645
See application file for complete search history.

(56) References Cited

U.S. PATENT DOCUMENTS

| | | | | |
|---|---|---|---|---|
| 5,041,059 | A | * | 8/1991 | Ricketts ................ A01F 12/446 460/902 |
| 6,053,812 | A | * | 4/2000 | Loewen ................ A01F 12/448 460/109 |
| 6,790,137 | B2 | * | 9/2004 | Gorden ................. A01F 12/446 460/99 |
| 7,399,223 | B2 | | 7/2008 | Weichholdt et al. |
| 7,566,266 | B1 | | 7/2009 | Ricketts et al. |
| 7,896,731 | B2 | | 3/2011 | Schwinn |
| 7,997,967 | B2 | | 8/2011 | Ricketts et al. |
| 2003/0140612 | A1 | * | 7/2003 | Gorden ................. A01F 12/446 460/99 |
| 2010/0144412 | A1 | | 6/2010 | Schwinn |
| 2020/0060084 | A1 | * | 2/2020 | Meschke ............. A01D 45/021 |

FOREIGN PATENT DOCUMENTS

| | | | | |
|---|---|---|---|---|
| CN | 115362835 | A * | 11/2022 | ............ A01F 12/448 |
| EP | 2796032 | A2 * | 10/2014 | ............ A01F 12/448 |
| EP | 3598884 | A1 * | 1/2020 | ............ A01D 41/127 |
| EP | 4091433 | A1 * | 11/2022 | ............ A01F 12/448 |

* cited by examiner

*Primary Examiner* — Terrell H Matthews
(74) *Attorney, Agent, or Firm* — Taft Stettinius & Hollister LLP; Stephen F. Rost

(57) ABSTRACT

An exemplary sieve mechanism is configured for separating grain from chaff. The sieve mechanism generally includes a frame and a louvered region including a plurality of louvers mounted to the frame. The sieve mechanism further includes and an unlouvered region lacking louvers such that a gap is defined adjacent the louvered region.

19 Claims, 10 Drawing Sheets

PARTIALLY-UNLOUVERED SIEVE MECHANISM

CROSS-REFERENCE TO RELATED APPLICATIONS

The present application claims the benefit of U.S. Provisional Patent Application No. 63/059,429, filed Jul. 31, 2020, the contents of which are incorporated by reference in their entirety.

TECHNICAL FIELD

The present disclosure generally relates to sieve mechanisms, and more particularly but not exclusively relates to sieve elements for use in a cleaning system of an agricultural combine.

BACKGROUND

Agricultural combines typically include a cleaning system that receives a mixture of grain and chaff, and which separates the grain from the chaff. The cleaning system typically includes a sieve positioned in the vicinity of a blower such that the heavier grain falls through the sieve while the lighter chaff is blown away for disposal. However, it has been found that should the feed rate of the mixture into the sieve be too high, the mixture may accumulate and spill into the blower, thereby at least partially blocking the airflow from the blower. For these reasons among others, there remains a need for further improvements in this technological field.

SUMMARY

An exemplary sieve mechanism is configured for separating grain from chaff. The sieve mechanism generally includes a frame and a louvered region including a plurality of louvers mounted to the frame. The sieve mechanism further includes and an unlouvered region lacking louvers such that a gap is defined adjacent the louvered region. Further embodiments, forms, features, and aspects of the present application shall become apparent from the description and figures provided herewith.

DETAILED DESCRIPTION OF ILLUSTRATIVE EMBODIMENTS

Figure 1:
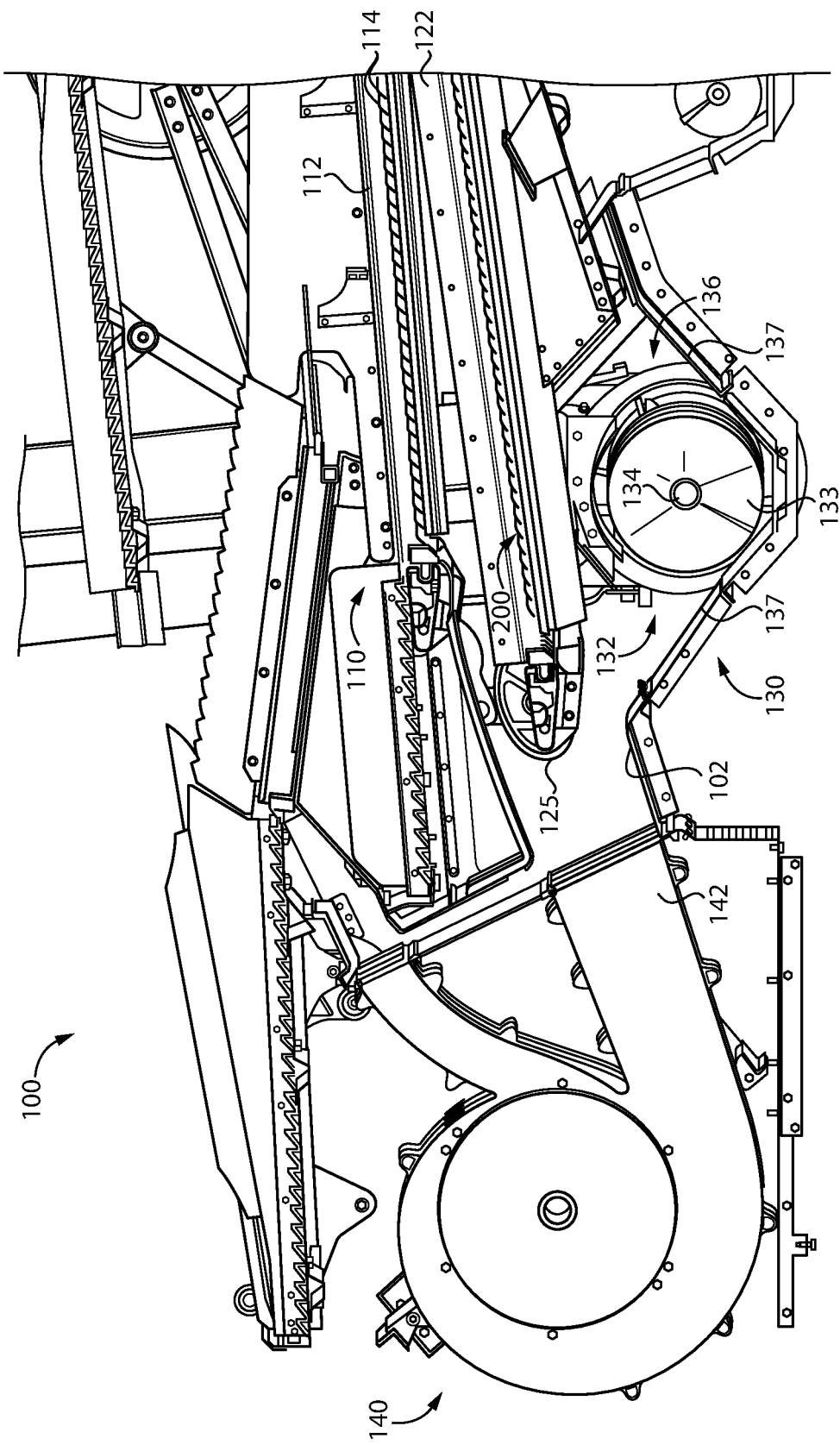
FIG. 1 is a cutaway view of a cleaning system according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 2:
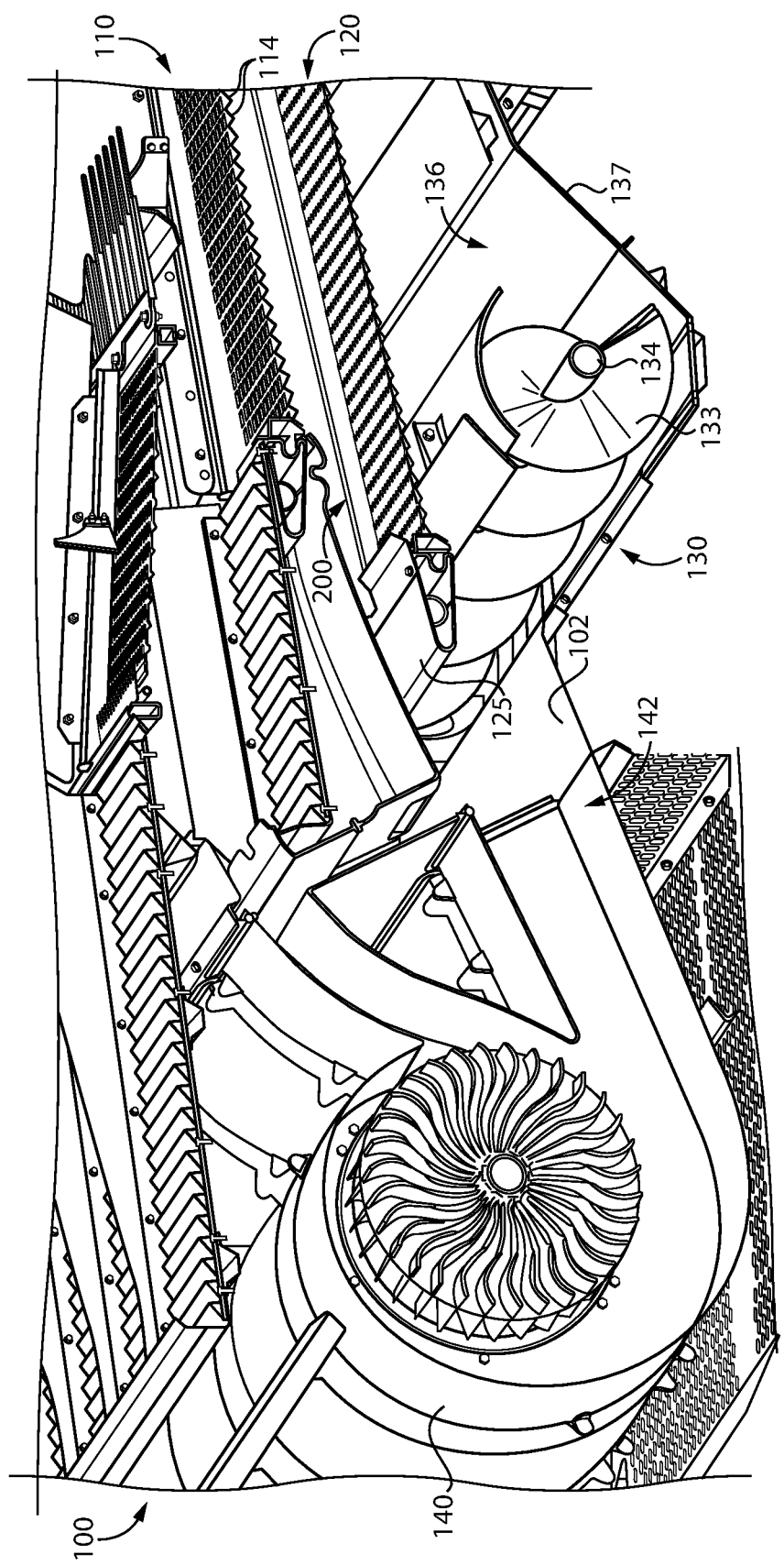
FIG. 2 is a perspective cutaway view of the cleaning system illustrated in FIG. 1.

With reference to FIGS. 1 and 2, illustrated therein is a cleaning system 100 for separating grain from chaff. In the illustrated embodiment, the cleaning system 100 is provided in a combine or another form of mobile agricultural equipment. It is also contemplated that the cleaning system 100 may be provided in a stationary facility. The cleaning system 100 generally includes a chaffer assembly 110 that receives an agricultural mixture including grain and chaff, a sieve assembly 120 that receives agricultural mixture from the chaffer assembly 110 and separates grain from chaff, an auger assembly 130 that receives clean grain from the sieve assembly 120, and a blower 140 that aids in blowing the separated chaff away from the sieve assembly 120 for disposal.

The chaffer assembly 110 generally includes a chaffer frame 112 and a plurality of chaffer louvers 114 mounted to the chaffer frame 112. During operation of the cleaning system 100, the chaffer assembly 110 receives a mixture of grain and chaff from above, and the chaffer louvers 114 act as an initial or upper sieve that aids in removing at least some of the chaff from the mixture. In certain forms, the chaffer assembly 110 may alternatively be referred to as an upper sieve assembly 110. The removed chaff is directed in a rearward direction (to the right in FIG. 1) for disposal. In certain embodiments, the cleaning system 100 may vibrate to facilitate the filtering action of the chaffer assembly 110. Additionally or alternatively, at least a portion of the cleaning system 100 may pivotably oscillate to facilitate the direction of the separated chaff rearward for disposal. The remainder of the mixture falls through the chaffer assembly 110 and is received by the sieve assembly 120.

In the illustrated form, the chaffer louvers 114 are evenly spaced and are substantially identical to one another. It is also contemplated that the chaffer louvers 114 may be unevenly spaced and/or include various different configurations. For example, the chaffer louvers 114 in a first region may be spaced apart by a first distance while the chaffer louvers 114 in a second region may be spaced apart by a second distance different from the first distance. Additionally or alternatively, the chaffer louvers 114 in a first region may have a first configuration and the chaffer louvers 114 in a second region may have a second configuration different from the first configuration. In the illustrated form, the chaffer louvers 114 are adjustable to adjust the size of an opening between the chaffer louvers 114. For example, the chaffer louvers 114 may be connected to one or more actuators operable to adjust the opening angle of one or more of the louvers 114. In certain embodiments, all chaffer louvers 114 may be opened to the same opening angle. In other embodiments, the chaffer louvers 114 in a first region may be open to a first opening angle and the chaffer louvers 114 in a second region may be opened to a second opening angle different from the first opening angle. In the illustrated form, the chaffer frame 112 is fully louvered. As described herein, it is also contemplated that the chaffer assembly 110 may include an unlouvered region.

Figure 3:
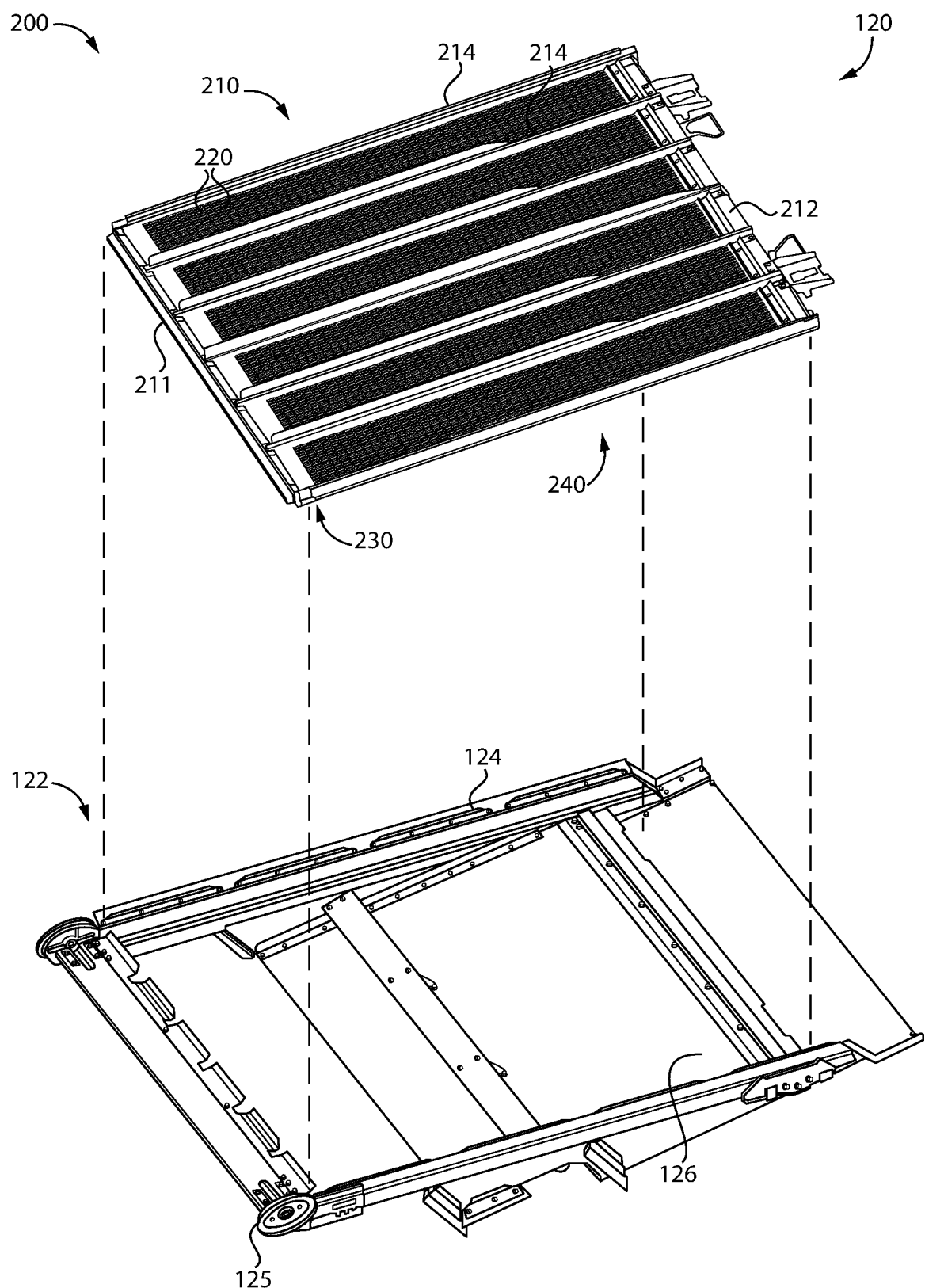
FIG. 3 is an exploded assembly view of a sieve assembly according to certain embodiments.
Figure 4:
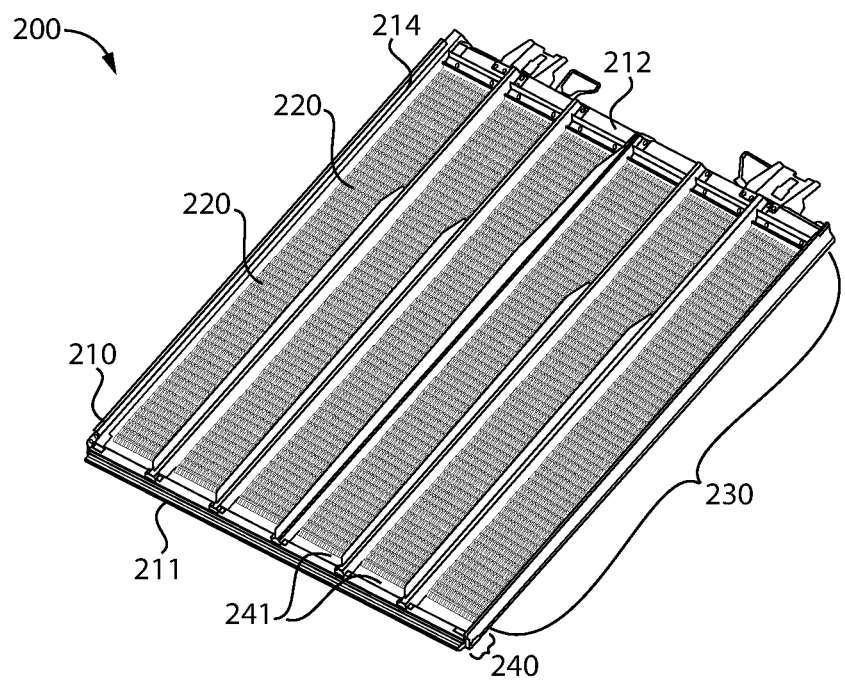
FIG. 4 is a perspective view of a partially-unlouvered sieve mechanism according to certain embodiments.
Figure 5:
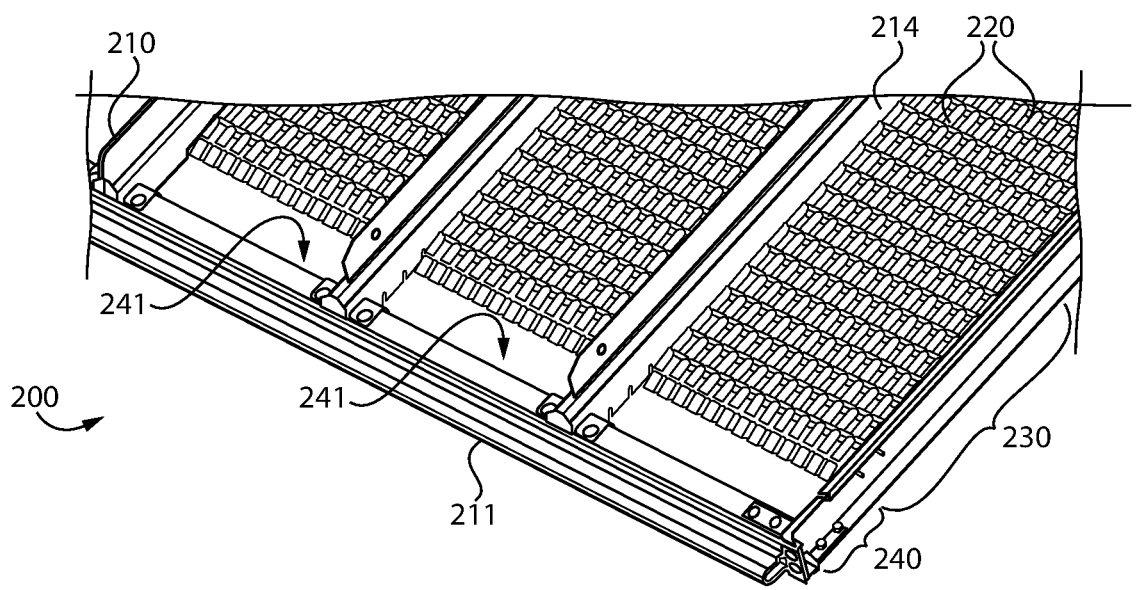
FIG. 5 is an enlarged perspective view of a portion of the sieve mechanism illustrated in FIG. 4.
Figure 6:
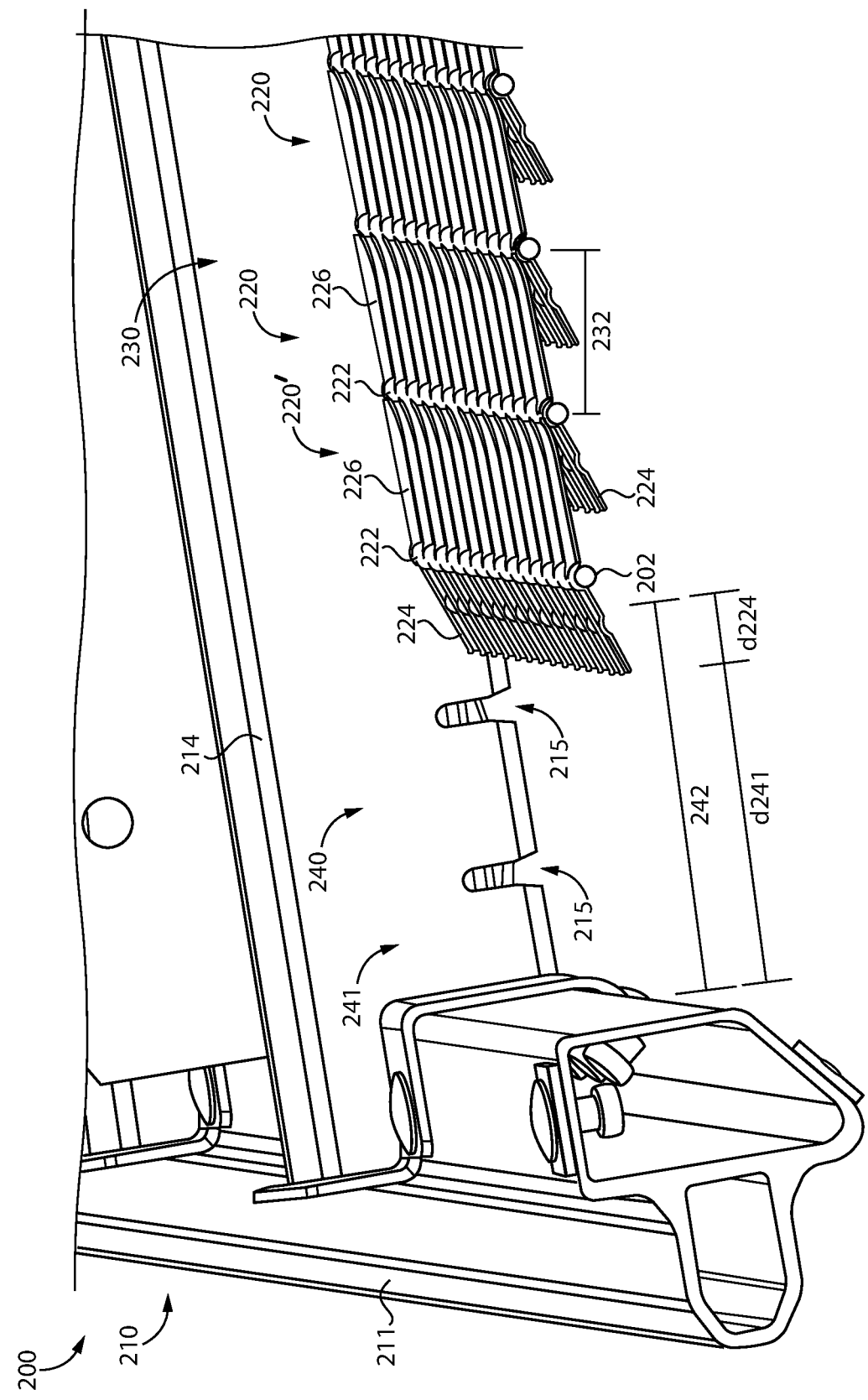
FIG. 6 is a partial cutaway view of the sieve mechanism illustrated in FIG. 4, in which louvers of the sieve mechanism are in a closed position.
Figure 7:
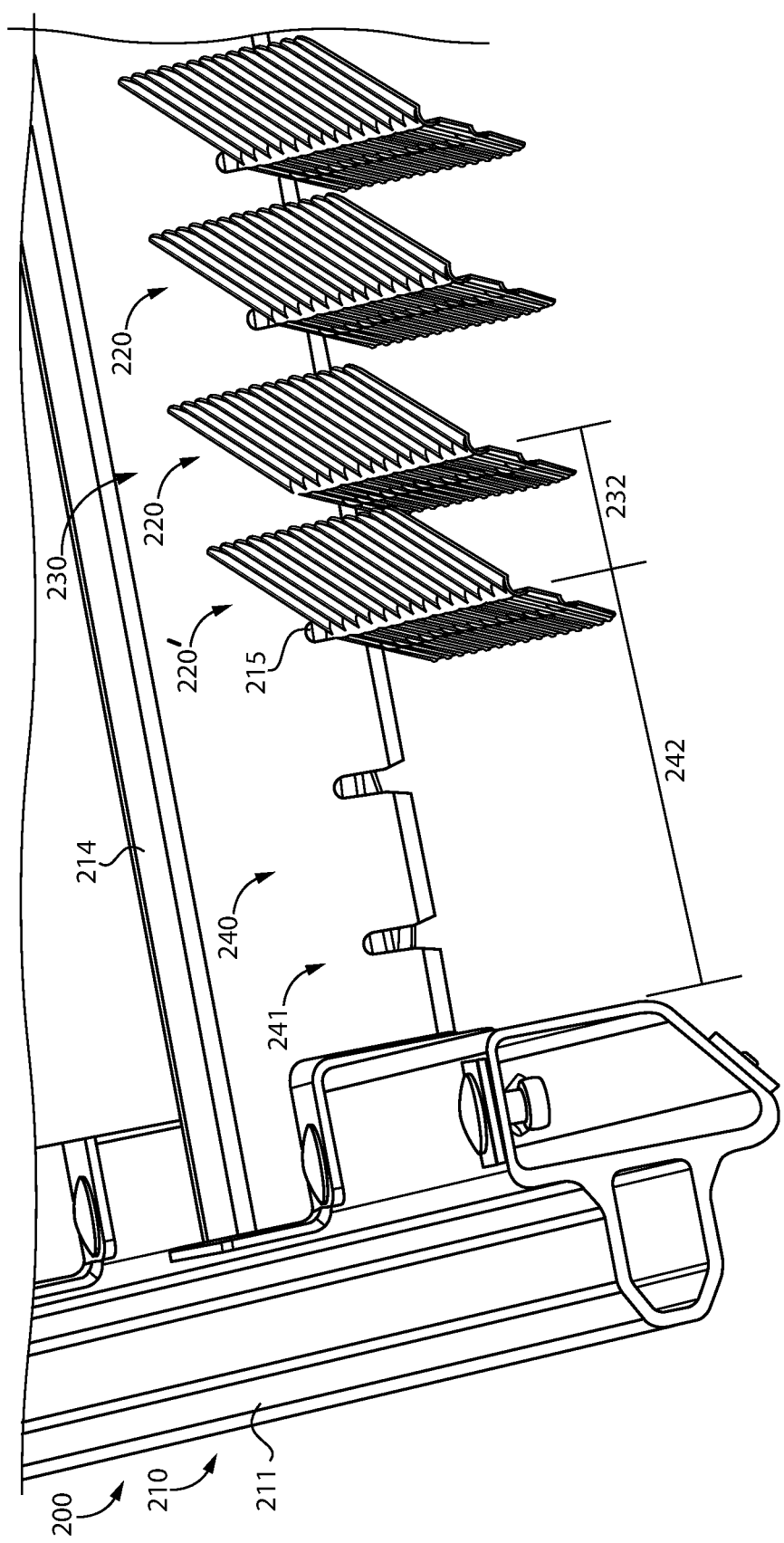
FIG. 7 is a partial cutaway view of the sieve mechanism illustrated in FIG. 4, in which the louvers of the sieve mechanism are in an open position.

With additional reference to FIG. 3, the sieve assembly 120 generally includes a sieve frame 122 and a partially-unlouvered sieve mechanism 200 mounted to the sieve frame 122. The sieve frame 122 generally includes a mounting frame 124 sized and shaped to receive the sieve mechanism 200, and a pan 126 is disposed below the mounting frame 124. The mounting frame 124 extends from the pan 126 to a nose 125 that is positioned nearer the blower 140 than the pan 126. The pan 126 may be angled in a downward direction to aid in directing clean grain sifted by the sieve mechanism 200 toward a collection area 136 of the auger assembly 130. As described herein, the sieve mechanism 200 generally includes a frame 210 and a plurality of sieve louvers 220 movably mounted to the frame 210.

During operation of the illustrated cleaning system 100, the sieve assembly 120 receives a mixture of grain and chaff from the chaffer assembly 110, and the sieve louvers 220 act as a secondary or lower sieve that aids in removing at least some of the remaining chaff from the mixture. The removed chaff is directed in a rearward direction (to the right in FIG. 1) for disposal at least in part by the blowing action of the blower 140. As noted above, the cleaning system 100 may vibrate, which may facilitate the filtering action of the sieve assembly 120. Additionally or alternatively, at least a portion of the cleaning system 100 may pivotably oscillate to facilitate the direction of the separated chaff rearward (to the right in FIG. 1) for disposal. The clean grain separated from the mixture falls through the sieve assembly 120 and is received at the auger assembly 130.

The auger assembly 130 generally includes an auger 132 that is positioned within a collection area 136 defined by one or more walls 137. The auger 132 includes at least one helical ramp 133, and may further include a central post 134 about which the helical ramp 133 is wrapped. Clean grain sifted by the sieve assembly 120 falls from the sieve assembly 120 into the collection area 136, and is directed by the auger 132 into a grain bin for collection. More particularly, rotation of the auger 132 in a collecting direction causes the helical ramp 133 to push the clean grain toward and into the grain bin. Those skilled in the art will readily appreciate that the auger 132 may be connected either directly or indirectly to a motor, engine, or power takeoff that causes such rotation of the auger 132.

The blower 140 is mounted in the vicinity of the sieve assembly 120 and is configured to blow air through an outlet 142 at a speed and volumetric flowrate sufficient to urge chaff toward the disposal location. In the illustrated form, the disposal location is rearward of the sieve assembly 120 (to the right in FIG. 1), and the blower 140 is positioned forward of the sieve assembly 120 and blows air rearward to urge the chaff toward the disposal location. For example, in embodiments in which the cleaning system 100 is mounted to a vehicle, the chaff may be disposed of by dumping the chaff behind the vehicle as the vehicle moves forward and harvests the crop. Positioned adjacent the blower 140 is a floor 102 that extends from the outlet 142 toward the collection area 136.

With additional reference to FIGS. 4-7, the partially-unlouvered sieve mechanism 200 generally includes a frame 210 and a plurality of sieve louvers 220 movably mounted to the frame 210. More particularly, the sieve mechanism 200 includes a louvered region 230 that includes louvers 220 and an unlouvered region 240 that lacks louvers 220. As described herein, the louvered region 230 aids in separating grain from chaff while the unlouvered region 240 discourages the unwanted spilling of mixture over the nose 125.

The frame 210 generally includes a forward lateral slat 211 positioned near the nose 125, a rear lateral slat 212, and a plurality of laterally-spaced longitudinal slats 214 extending between and connecting the lateral slats 211, 212. In the illustrated form, each longitudinal slat 214 includes a plurality of slots 215 for receiving wires 202 to which the louvers 220 are mounted. The wires 202 may be connected with an actuator to facilitate rotation of the louvers 220 between a closed position for blocking passage of grain and a plurality of open positions for permitting passage of grain through the sieve mechanism 200.

Each of the illustrated louvers 220 generally includes a body portion 222 through which a wire 202 extends, a first flange 224 extending from the body portion 222 in a first direction, and a second flange 226 extending from the body portion 222 in a second direction generally opposite the first direction. In the illustrated form, the second flange 226 is angularly offset from the first flange 224 such that the louver 220 has a bent or angled configuration. When the louvers 220 are rotated from a closed position (FIG. 6) to an open position (FIG. 7), gaps appear between the louvers 220 to permit the passage of clean grain while discouraging the passage of chaff. As should be appreciated, the illustrated open position may be just one of many open positions to which the louvers 220 can be rotated. For example, the louvers 220 may be rotated to a less-open position for smaller grain, and rotated to a more-open position for larger grain.

The louvered region 230 generally includes a plurality of the louvers 220. In the illustrated form, the sieve louvers 220 are evenly spaced and are substantially identical to one another. It is also contemplated that the sieve louvers 220 may be unevenly spaced and/or include various different configurations. For example, the sieve louvers 220 in a first portion of the louvered region 230 may be spaced apart by a first distance while the sieve louvers 220 in a second portion of the louvered region 230 may be spaced apart by a second distance different from the first distance. Additionally or alternatively, the sieve louvers 220 in a first portion of the louvered region 230 may have a first configuration and the sieve louvers 220 in a second portion of the louvered region 230 may have a second configuration different from the first configuration. In the illustrated form, the sieve louvers 220 are adjustable to adjust the size of an opening between the sieve louvers 220. For example, the sieve louvers 220 may be connected to one or more actuators operable to adjust the opening angle of one or more of the louvers 220. In certain embodiments, all sieve louvers 220 may be opened to the same opening angle. In other embodiments, the sieve louvers 220 in a first portion of the louvered region 230 may be open to a first opening angle and the sieve louvers 220 in a second portion of the louvered region 230 may be opened to a second opening angle different from the first opening angle. In certain embodiments, one or more of the louvers 220 may have a fixed orientation relative to the sieve mechanism frame 210.

Within the louvered region 230, the body portions 222 of adjacent louvers 220 are spaced apart by an average offset distance 232. In the illustrated form, all adjacent pairs of louvers 220 in the louvered region 230 are spaced apart by the same distance such that the average distance 232 is the same as the distance between the body portions 222. As noted above, however, it is also contemplated that the louvers 220 may be spaced apart by varying distances, in which case some adjacent louvers 220 may be spaced apart from one another by distances greater than the average offset distance 232 while other pairs of adjacent louvers 220 are offset from one another by distances less than the average offset distance 232. When the louvers 220 are in their fully open positions, the gap between adjacent louvers 220 corresponds to the offset distance between the body portions 222 of those louvers 220.

As should be appreciated, the unlouvered region 240 lacks louvers 220 such that one or more gaps 241 are formed in the sieve mechanism 200. In the illustrated form, the unlouvered region 240 is formed adjacent the forward lateral slat 211 such that the gaps 241 are defined between the foremost louver 220' and the forward lateral slat 211. It is also contemplated that the unlouvered region 240 may be provided at a different location within the sieve mechanism 200, such that at least one of the louvers 220 is positioned forward of the unlouvered region 240.

The unlouvered region 240 has a longitudinal dimension 242 that is greater than the average offset distance 232. In certain forms, the longitudinal dimension 242 of the unlouvered region 240 is at least twice as large as the average offset distance 232 such that there is space for at least one additional louver 220 in the unlouvered region 240. In the illustrated form, the longitudinal dimension 242 of the unlouvered region 240 is approximately three times the average offset distance 232 such that there is space for two additional louvers 220 in the unlouvered region 240. It is also contemplated that the longitudinal dimension 242 may be greater than three times the average offset distance such that there is space for more than two additional louvers 220 in the unlouvered region 240. In the illustrated form, the unlouvered region 240 includes slots 215 by which such additional louvers 220 may be mounted in the unlouvered region 240. In other embodiments, the slots 215 may be absent from the unlouvered region 240.

As should be evident from the foregoing, in certain embodiments, the longitudinal dimension 242 of the unlouvered region 240 may be selected based at least in part upon the average longitudinal offset distance 232. Additionally or alternatively, the longitudinal dimension 242 of the unlouvered region 240 may be selected based at least in part upon the dimensions of a flange of one or more adjacent louvers 220. For example, in the arrangement illustrated in FIGS. 6 and 7, the first flange 224 of the foremost louver 220' projects by a first distance d224 into the unlouvered region 240, which is defined between the forward lateral slat 211 and the slot 215 in which the wire 202 of the foremost louver 220' is seated. Thus, in order to ensure the presence of the gap 241, the longitudinal dimension 242 of the unlouvered region 240 may be selected to be greater than the longitudinal dimension d224 of the first flange 224 of the foremost louver 220', thereby providing the gap 241 with a non-zero longitudinal dimension d241. In certain embodiments, the longitudinal dimension d241 may be greater than the first distance d224. In certain embodiments, the longitudinal dimension d241 may be greater than the longitudinal dimension of one or more of the louvers 220, such as the forward-most louver 220'.

Figure 8:
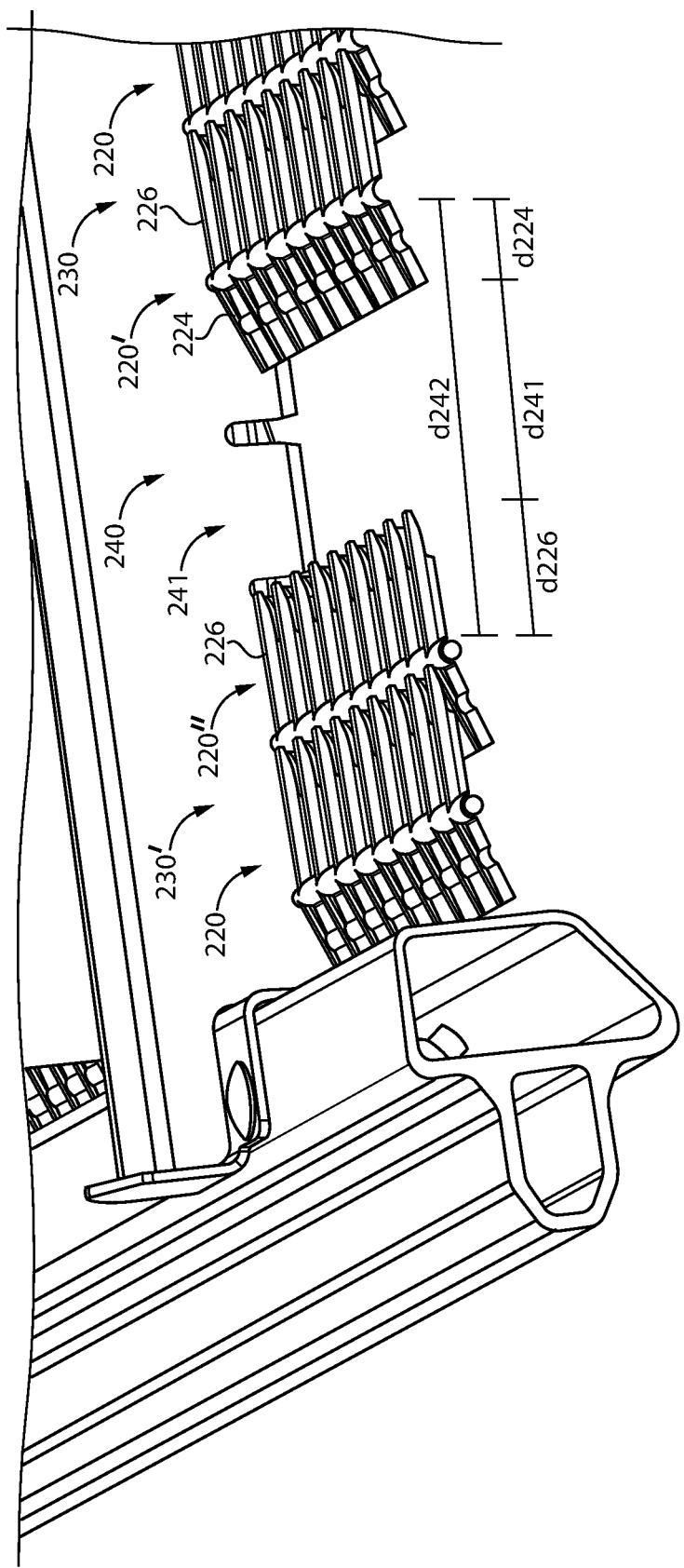
FIG. 8 is a partial cutaway view of the sieve mechanism illustrated in FIG. 4 in a different configuration with louvers in a closed position.

With additional reference to FIG. 8, it is also contemplated that the unlouvered region 240 may be provided between a first or rearward louvered region 230 and a second or forward louvered region 230'. In such forms, the second flange 226 of the rearmost louver 220" of the forward louvered region 230' may project by a second distance d226 into the unlouvered region 240, which is defined between the slots 215 in which the louvers 220', 220" are mounted. Thus, in order to ensure the presence of the gap 241, the longitudinal dimension 242 of the unlouvered region 240 may be selected to be greater than the sum of the longitudinal dimension d224 of the first flange 224 of the first louver 220' and the longitudinal dimension d226 of the second flange 226 of the second louver 220", thereby providing the gap 241 with a non-zero longitudinal dimension d241. In certain embodiments, the longitudinal dimension d241 may be greater than the first distance d224. In certain embodiments, the longitudinal dimension d241 may be greater than the second distance d226. In certain embodiments, the longitudinal dimension d241 of the gap 241 may be greater than the longitudinal dimension of the louvers 220, which corresponds to the sum of the distances d224, d226.

In the illustrated form, the upper sieve (i.e., the sieve of the chaffer assembly 110) is fully louvered, and the lower sieve (i.e., the sieve of the sieve assembly 120) is partially unlouvered. It is also contemplated that the sieve of the chaffer assembly 110 may be provided with an unlouvered region analogous to that described with reference to the sieve mechanism 200. In such forms, the lower sieve (i.e., the sieve of the sieve assembly 120) may be provided with an unlouvered region, or may be fully louvered.

Figure 9:
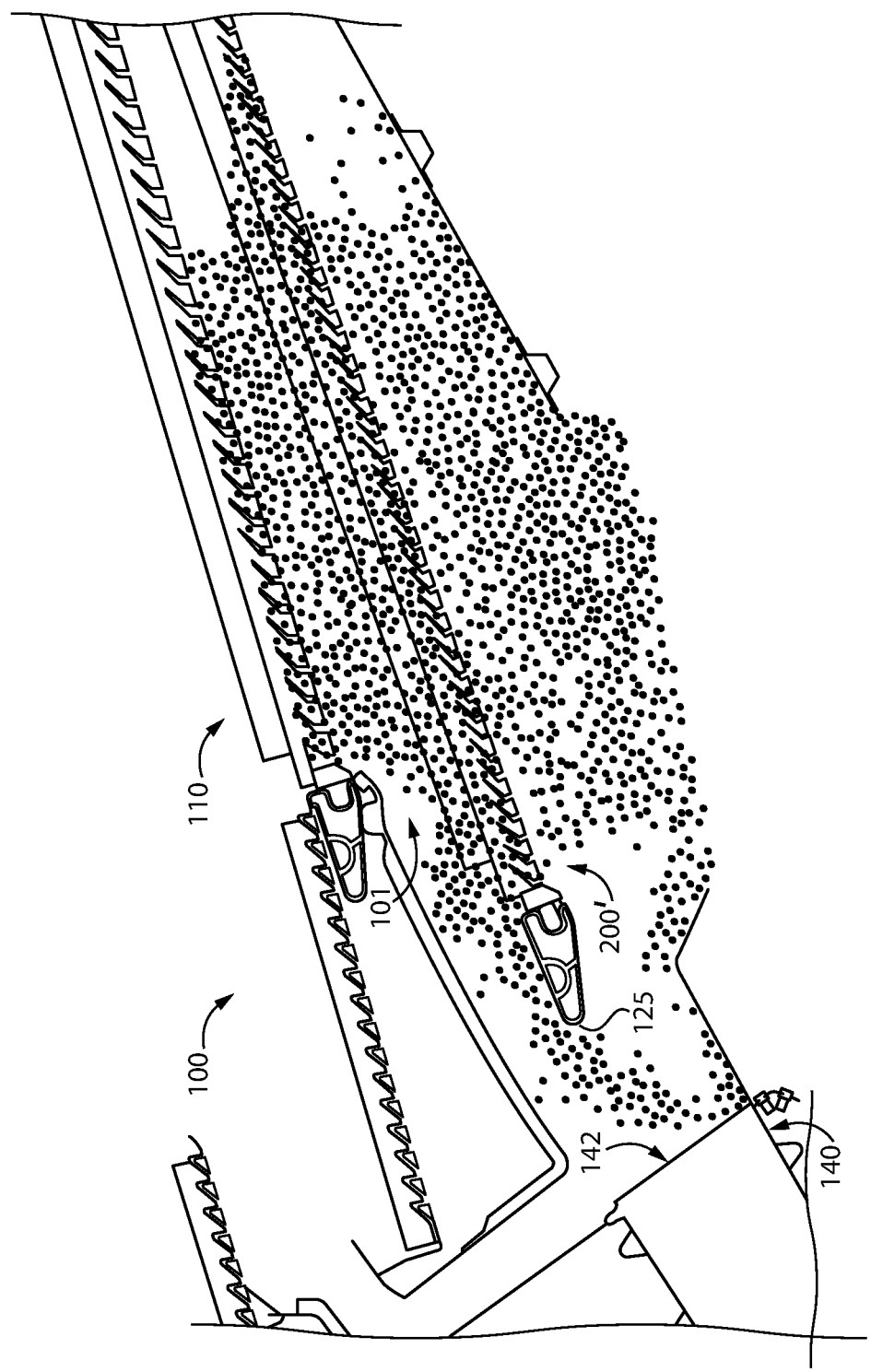
FIG. 9 is a schematic illustration of the cleaning assembly illustrated in FIG. 1 operating with a fully-louvered sieve mechanism.

With additional reference to FIG. 9, illustrated therein is a schematic representation of the cleaning system 100 with a traditional sieve mechanism 200' installed in place of the partially-unlouvered sieve mechanism 200. More particularly, FIG. 8 illustrates the cleaning system 100 being supplied with a grain-chaff mixture 101 at a relative high volumetric flowrate while the combine to which the cleaning system 100 is mounted travels downhill. These conditions lead to an excess of the mixture 101 at the fore of the traditional sieve mechanism 200', with the excess mixture 101 spilling over the sieve assembly nose 125 and falling into the blower outlet 142. This results in clogging of the blower outlet 142, which exacerbates the situation by allowing the mixture 101 to spill over the nose 125 at a higher rate, leading to further clogging of the blower outlet 142.

Figure 10:
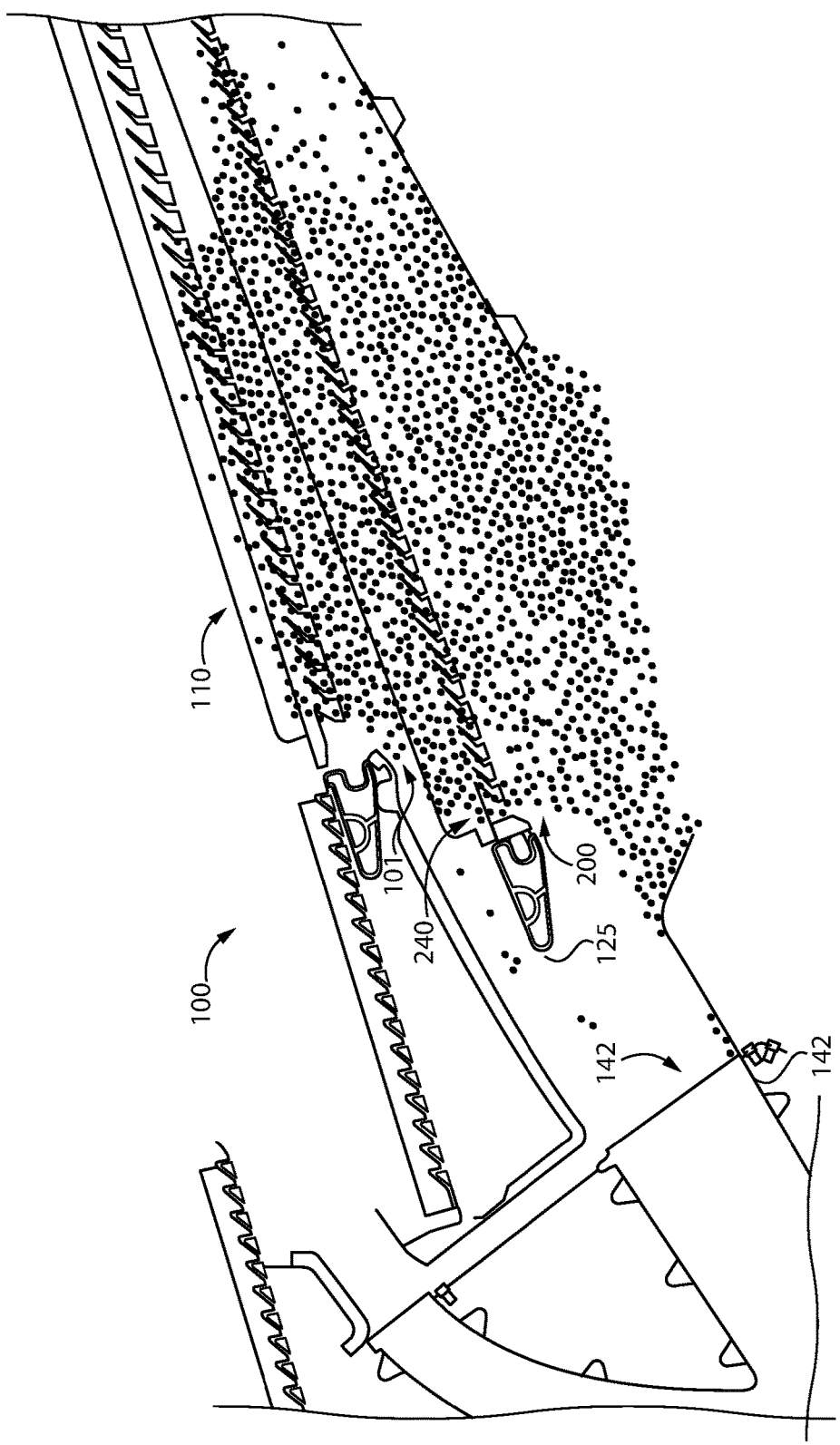
FIG. 10 is a schematic illustration of the cleaning assembly illustrated in FIG. 1 operating with the partially-unlouvered sieve mechanism illustrated in FIGS. 4-7.

With additional reference to FIG. 10, illustrated therein is a schematic representation of the cleaning system 100 with the partially-unlouvered sieve mechanism 200 installed and operating under the same conditions as those present in FIG. 9. As is evident, the unlouvered region 240 permits the mixture 101 to fall toward the collection area 136 at a higher volumetric flowrate, thereby preventing the above-described buildup of excess mixture 101 and clogging of the blower outlet 142. While the grain falling through the unlouvered region 240 does not necessarily undergo the same degree of sifting as that experienced by the mixture 101 that is sifted through the louvered region 230, it has been found that the increase in chaff mixed with the clean grain is relatively low.

Figure 11:
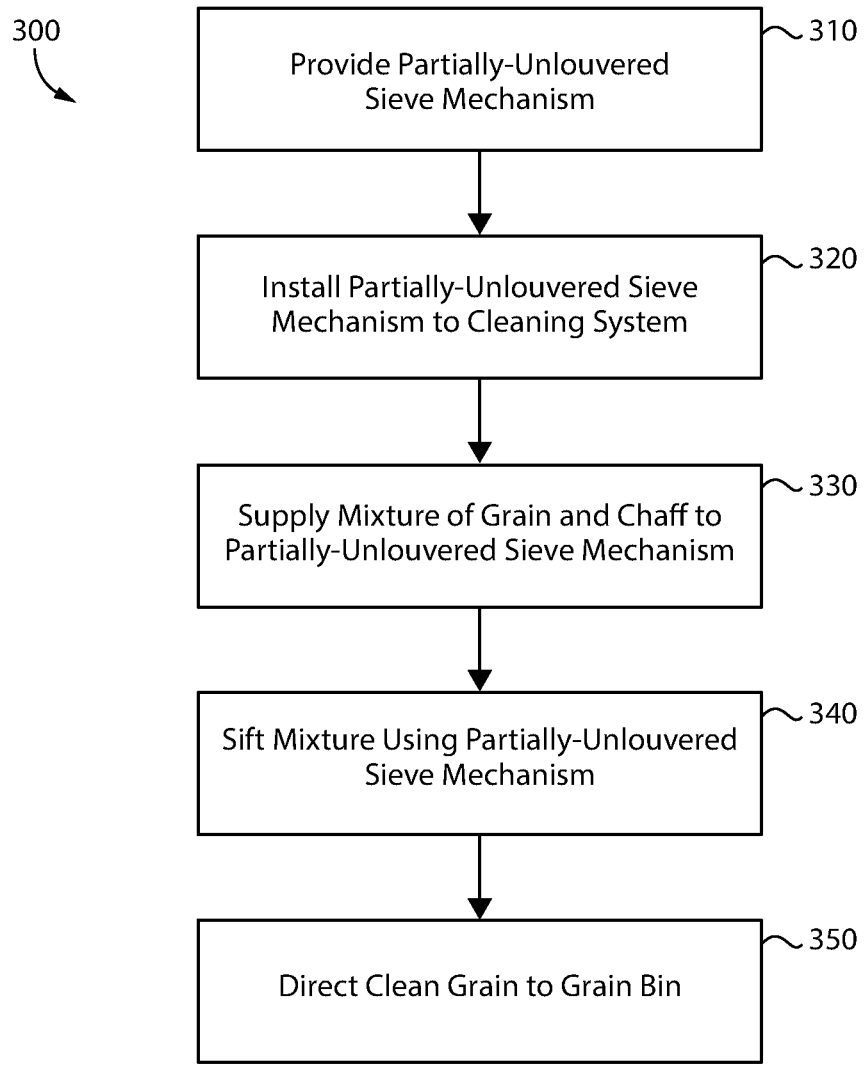
FIG. 11 is a schematic flow diagram of a process according to certain embodiments.

With additional reference to FIG. 11, illustrated therein is an exemplary process 300 according to certain embodiments. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the cleaning system 100 and sieve mechanism 200 illustrated in FIGS. 1-8, it is to be appreciated that the process 300 may be performed with cleaning systems and/or sieve mechanisms having additional or alternative features.

The process 300 includes block 310, which generally involves providing a partially-unlouvered sieve mechanism, such as the sieve mechanism 200. The partially-unlouvered sieve mechanism provided in block 310 may include a frame 210, a louvered region 230 comprising a plurality of louvers 220 mounted to the frame 210, and an unlouvered region lacking louvers 220. In certain embodiments, block 310 involves retrofitting an existing sieve mechanism. For example, block 310 may involve removing at least one louver from a fully-louvered sieve mechanism, such as the fully-louvered sieve mechanism 200' illustrated in FIG. 9. It is also contemplated that block 310 may involve providing the partially-unlouvered sieve mechanism as an original product. For example, block 310 may involve movably mounting the plurality of louvers 220 to the frame 210 with an average longitudinal offset distance 232 to thereby define the louvered region 230, and providing the unlouvered region 240 with a longitudinal dimension 242 greater than the average longitudinal offset distance 232 (e.g., at least twice the average longitudinal offset distance 232).

The process 300 may further include block 320, which generally involves installing the partially-unlouvered sieve mechanism 200 to a cleaning system, such as the cleaning system 100. For example, block 320 may involve installing the sieve mechanism 200 above a collection area 136 such that grain sifted by the sieve mechanism 200 falls toward the collection area 136. In certain embodiments, the cleaning system 100 may further include a second sieve mechanism. In such forms, installing the partially-unlouvered sieve mechanism 200 may involve installing the sieve mechanism 200 between the second sieve mechanism (e.g., the sieve mechanism of the chaffer assembly 110) and the collection area 136. It is also contemplated that installing the partially-unlouvered sieve mechanism 200 may involve installing the sieve mechanism 200 above the second sieve mechanism, for example to provide the partially-unlouvered sieve mechanism 200 to the upper sieve assembly 110.

The process 300 may further include block 330, which generally involves supplying a mixture of grain and chaff to the partially-unlouvered sieve mechanism 200. In embodiments in which the partially-unlouvered sieve mechanism is installed in the lower sieve assembly 120, supplying the mixture to the partially-unlouvered sieve mechanism 200 may involve supplying the mixture from the upper sieve assembly 110. In embodiments in which the partially-unlouvered sieve mechanism 200 is installed to the upper sieve assembly 110, the mixture may be supplied from another component, such as a thresher.

The process 300 may further include block 340, which generally involves sifting the mixture using the partially-unlouvered sieve mechanism 200, thereby allowing grain to fall through the partially-unlouvered sieve mechanism 200 while retaining chaff above the partially-unlouvered sieve mechanism 200. While some chaff may fall through the partially-unlouvered sieve mechanism 200, the majority of the chaff in the mixture will generally be sifted out by the louvered region 230. The grain passing through the partially-unlouvered sieve mechanism 200 falls toward the collection area 136, either directly or via an intermediate sieve mechanism.

The process 300 may further include block 350, which generally involves directing clean grain from the collection area 136 to a grain bin. For example, block 350 may involve operating the auger 132 to drive grain from the collection area to the grain bin.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A sieve mechanism for separating grain from chaff in a cleaning system, the sieve mechanism comprising:
   a frame;
   a louvered region comprising a plurality of louvers mounted to the frame; and
   an unlouvered region lacking louvers such that at least one gap is defined adjacent the louvered region;
   wherein the louvers are rotatably mounted to the frame for rotation between a closed position and a fully open position; and
   wherein the at least one gap is defined within the frame when the louvers are in the closed position.

2. The sieve mechanism of claim 1, wherein the frame includes a forward lateral slat, a rearward lateral slat, and a plurality of longitudinal slats connecting the forward lateral slat and the rearward lateral slat.

3. The sieve mechanism of claim 2, wherein the unlouvered region is defined adjacent the forward lateral slat such that the at least one gap is defined between the forward lateral slat and a forward-most louver of the plurality of louvers.

4. The sieve mechanism of claim 2, wherein the louvers are rotatably mounted to the longitudinal slats for rotation between the closed position and the fully open position.

5. The sieve mechanism of claim 4, wherein with the louvers in the fully open position:
   adjacent louvers are offset from one another by an average longitudinal offset distance; and
   a longitudinal dimension of the unlouvered region is at least twice the average longitudinal offset distance.

6. A sieve mechanism for separating grain from chaff in a cleaning system, the sieve mechanism comprising:
   a frame;
   a louvered region comprising a plurality of louvers mounted to the frame; and
   an unlouvered region lacking louvers such that a gap is defined adjacent the louvered region;
   wherein each louver comprises a body portion and a flange extending from the body portion;
   wherein the body portions of adjacent louvers within the louvered region have an average longitudinal offset distance; and
   wherein the unlouvered region has a longitudinal dimension at least twice the average longitudinal offset distance.

7. The sieve mechanism of claim 1, wherein a first louver of the plurality of louvers projects into the unlouvered region from a first side of the unlouvered region by a first distance when the first louver is closed; and
   wherein the unlouvered region has a longitudinal dimension greater than the first distance.

8. The sieve mechanism of claim 7, wherein a second louver of the plurality of louvers projects into the unlouvered region from a second side of the unlouvered region by a second distance when the second louver is closed; and
   wherein the longitudinal dimension of the unlouvered region is greater than a sum of the first distance and the second distance.

9. A cleaning system for separating grain from chaff, the cleaning system comprising:
   a sieve assembly comprising a sieve mechanism, the sieve mechanism comprising:
      a sieve mechanism frame;
      a louvered region comprising a plurality of louvers rotatably mounted to the frame for rotation between a closed position and an open position; and
      an unlouvered region lacking louvers such that at least one gap is defined within the sieve mechanism frame when the louvers are in the closed position;
   a collection area positioned below the sieve mechanism; and
   a grain auger extending into the collection area, the grain auger operable to drive grain from the collection area to a grain bin.

10. The cleaning system of claim 9, further comprising a second sieve assembly, the second sieve assembly comprising a second sieve mechanism positioned between the sieve assembly and the collection area.

11. The cleaning system of claim 10, wherein the second sieve mechanism comprises a second louvered region and a second unlouvered region.

12. The cleaning system of claim 9, further comprising a blower configured and positioned to blow air in a rearward direction over a nose of the sieve assembly;
   wherein the unlouvered region is positioned forward of the louvered region.

13. The cleaning system of claim 12, wherein the sieve mechanism lacks louvers between the unlouvered region and the nose of the sieve assembly.

14. The cleaning system of claim 9, wherein adjacent louvers within the louvered region are offset from one another by an average longitudinal offset distance; and
   wherein a longitudinal dimension of the unlouvered region is at least twice the average longitudinal offset distance.

15. A method, comprising:
   providing a partially-unlouvered sieve mechanism comprising:
      a frame;
      a louvered region comprising a plurality of louvers movably mounted to the frame such that each louver has an open position and a closed position; and
      an unlouvered region lacking louvers such that at least one gap is defined within the sieve mechanism frame when the louvers are in the closed position;
   sifting a mixture of grain and chaff using the partially-unlouvered sieve mechanism, thereby allowing grain to fall through the partially-unlouvered sieve mechanism while retaining chaff above the partially-unlouvered sieve mechanism.

16. The method of claim 15, further comprising installing the partially-unlouvered sieve mechanism to a cleaning system including a collection area;

wherein installing the partially-unlouvered sieve mechanism to the cleaning system comprises installing the partially-unlouvered sieve mechanism above the collection area.

17. The method of claim 16, wherein the cleaning system further comprises a second sieve mechanism, and wherein installing the partially-unlouvered sieve mechanism to the cleaning system comprises installing the partially-unlouvered sieve mechanism above the second sieve mechanism.

18. The method of claim 15, wherein providing the partially-unlouvered sieve mechanism comprises removing at least one louver from a fully-louvered sieve mechanism.

19. The method of claim 15, wherein providing the partially-unlouvered sieve mechanism comprises:

movably mounting the plurality of louvers to the frame with an average longitudinal offset distance, thereby defining the louvered region; and providing the unlouvered region with a longitudinal dimension at least twice the average longitudinal offset distance.

\* \* \* \* \*